(12) United States Patent
Ishibashi et al.

(10) Patent No.: US 11,767,706 B2
(45) Date of Patent: Sep. 26, 2023

(54) METHOD FOR MANUFACTURING GLASS PANEL UNIT, AND METHOD FOR MANUFACTURING GLASS WINDOW

(71) Applicant: Panasonic Intellectual Property Management Co., Ltd., Osaka (JP)

(72) Inventors: Tasuku Ishibashi, Ishikawa (JP); Eiichi Uriu, Osaka (JP); Kazuya Hasegawa, Osaka (JP); Hiroyuki Abe, Osaka (JP); Masataka Nonaka, Osaka (JP); Takeshi Shimizu, Osaka (JP); Haruhiko Ishikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 478 days.

(21) Appl. No.: 17/043,555

(22) PCT Filed: Mar. 13, 2019

(86) PCT No.: PCT/JP2019/010404
§ 371 (c)(1),
(2) Date: Sep. 29, 2020

(87) PCT Pub. No.: WO2019/188312
PCT Pub. Date: Oct. 3, 2019

(65) Prior Publication Data
US 2021/0115729 A1    Apr. 22, 2021

(30) Foreign Application Priority Data
Mar. 30, 2018 (JP) .................. 2018-069721

(51) Int. Cl.
*E06B 3/677* (2006.01)
*C03C 27/06* (2006.01)
*E06B 3/66* (2006.01)
(Continued)

(52) U.S. Cl.
CPC ............ *E06B 3/6775* (2013.01); *C03C 27/06* (2013.01); *E06B 3/6612* (2013.01);
(Continued)

(58) Field of Classification Search
CPC .................................................... E06B 3/6775
See application file for complete search history.

(56) References Cited

U.S. PATENT DOCUMENTS 5,664,395 A * 9/1997 Collins ................. E06B 3/6612
52/786.13
2015/0068665 A1  3/2015 Abe et al.
(Continued)

FOREIGN PATENT DOCUMENTS

JP    2015-147727 A    8/2015
WO   2013/172033 A1    11/2013
(Continued)

OTHER PUBLICATIONS

International Search Report and Written Opinion dated Jun. 6, 2019 in International Application No. PCT/JP2019/010404.

*Primary Examiner* — Philip C Tucker
*Assistant Examiner* — John Blades
(74) *Attorney, Agent, or Firm* — McDermott Will & Emery LLP

(57) ABSTRACT

A method for manufacturing a glass panel unit includes an adhesive disposing step, a glass composite generation step, an internal space forming step, an evacuation step, and an evacuated space forming step. The adhesive disposing step includes disposing a thermal adhesive on a second panel. The glass composite generation step includes generating a glass composite including a first panel, the second panel, and the thermal adhesive. The internal space forming step includes heating the glass composite to melt the thermal adhesive to form internal spaces (a first space and a second space). The evacuation step includes exhausting gas from the internal space to evacuate the internal space. The evacuated space forming step includes heating and applying force to part of a first portion or a second portion to deform the part to close an evacuation path to form an evacuated space hermetically closed.

4 Claims, 16 Drawing Sheets

(51) Int. Cl.
 E06B 3/663 (2006.01)
 E06B 3/673 (2006.01)
(52) U.S. Cl.
 CPC ........ *E06B 3/66333* (2013.01); *E06B 3/6736* (2013.01); *E06B 3/66304* (2013.01); *E06B 2003/66338* (2013.01)

(56) References Cited

U.S. PATENT DOCUMENTS

| | | |
|---|---|---|
| 2015/0068666 A1 | 3/2015 | Abe et al. |
| 2017/0210667 A1 | 7/2017 | Abe et al. |
| 2017/0298681 A1 | 10/2017 | Abe et al. |
| 2017/0299121 A1* | 10/2017 | Trpkovski ............. E06B 3/6775 |
| 2018/0038152 A1 | 2/2018 | Nonaka et al. |
| 2018/0179806 A1 | 6/2018 | Abe et al. |
| 2018/0283087 A1 | 10/2018 | Abe et al. |
| 2018/0319707 A1 | 11/2018 | Ishibashi et al. |
| 2019/0003246 A1* | 1/2019 | Trpkovski ........... E06B 3/67304 |
| 2019/0055775 A1 | 2/2019 | Abe et al. |
| 2019/0112226 A1 | 4/2019 | Abe et al. |
| 2020/0109594 A1 | 4/2020 | Abe et al. |

FOREIGN PATENT DOCUMENTS

| | | |
|---|---|---|
| WO | 2013/172034 A1 | 11/2013 |
| WO | 2016/051762 A1 | 4/2016 |
| WO | 2016/051787 A1 | 4/2016 |
| WO | 2016/143328 A1 | 9/2016 |
| WO | 2017/056419 A1 | 4/2017 |
| WO | 2017/056421 A1 | 4/2017 |
| WO | 2017/169253 A1 | 10/2017 |

\* cited by examiner

METHOD FOR MANUFACTURING GLASS PANEL UNIT, AND METHOD FOR MANUFACTURING GLASS WINDOW

CROSS REFERENCE TO RELATED APPLICATIONS

This application is the U.S. National Phase under 35 U.S.C. § 371 of International Application No. PCT/JP2019/010404, filed on Mar. 13, 2019, which in turn claims the benefit of Japanese Application No. 2018-069721, filed on Mar. 30, 2018, the entire contents of each are hereby incorporated by reference.

TECHNICAL FIELD

The present invention relates to a method for manufacturing a glass panel unit and a method for manufacturing a glass window.

BACKGROUND ART

Patent Literature 1 discloses an insulated glazing including a pair of flat glass panes facing each other with a prescribed distance therebetween and a method for manufacturing the insulated glazing.

The method for manufacturing the insulated glazing disclosed in Patent Literature 1 includes a first melting step of achieving a temperature higher than or equal to a softening point temperature of glass frit contained in a frit seal and a partition. In this way, peripheral portions of the pair of flat glass panes are sealed together, thereby forming a space which is hermetically closable. The space is evacuated, and then, a second melting step is performed to heat the pair of flat glass panes and the glass frit, thereby sealing an evacuation port.

Since the method for manufacturing the insulated glazing disclosed in Patent Literature 1 heats the pair of flat glass panes and the entirety of the glass frit in the second melting step, a large quantity of unnecessary gas is released from the entirety of the glass frit, which may lower the degree of vacuum of the space.

CITATION LIST

Patent Literature

Patent Literature 1: JP 2015-147727 A

SUMMARY OF INVENTION

One of the objectives of the present disclosure is to provide a method for manufacturing a glass panel unit which releases a reduced quantity of unnecessary gas and a method for manufacturing a glass window.

A method for manufacturing a glass panel unit of one aspect of the present disclosure includes: an adhesive disposing step, a glass composite generation step, an internal space forming step, an evacuation step, and an evacuated space forming step. The adhesive disposing step is a step of disposing a thermal adhesive on a first panel or a second panel. The glass composite generation step is a step of disposing the second panel to face the first panel to generate a glass composite including the first panel, the second panel, and the thermal adhesive. The glass composite has an evacuation port and an evacuation path. The evacuation port is formed in at least any one of the first panel, the second panel, or a first portion of the thermal adhesive which is to serve as a seal later. The evacuation path is located between the first portion and a second portion of the thermal adhesive and extends to the evacuation port. The internal space forming step is a step of heating the glass composite to melt the thermal adhesive to form an internal space surrounded by the first panel, the second panel, and a melted substance of the thermal adhesive except for the evacuation port. The evacuation step is a step of exhausting gas from the internal space to evacuate the internal space. The evacuated space forming step is a step of, while the internal space is kept in an evacuated state, heating and applying force to part of at least the first portion or the second portion to deform the part to close the evacuation path such that the internal space is sealed to form an evacuated space hermetically closed.

A manufacturing method of a glass window according to the present disclosure includes a step of fitting the glass panel unit manufactured by the method of the one aspect in a window frame to manufacture a glass window.

DESCRIPTION OF EMBODIMENTS

First to fourth embodiments below relate to a glass panel unit (the fourth embodiment further relates to a glass window). In particular, the first to fourth embodiments relate to a glass panel unit including a first panel, a second panel disposed to face the first panel with a prescribed distance from the first panel, and a seal disposed between the first panel and the second panel to hermetically bond the first panel and the second panel together.

Figure 1:
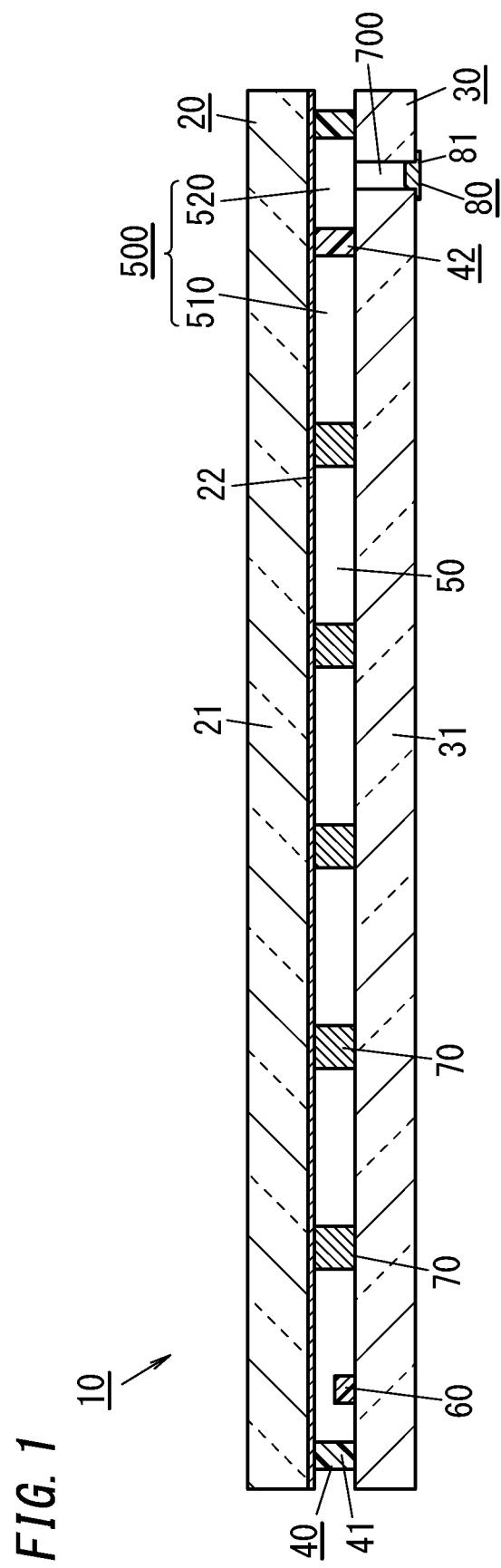
FIG. 1 is a vertical sectional view schematically illustrating a glass panel unit of a first embodiment.
Figure 2:
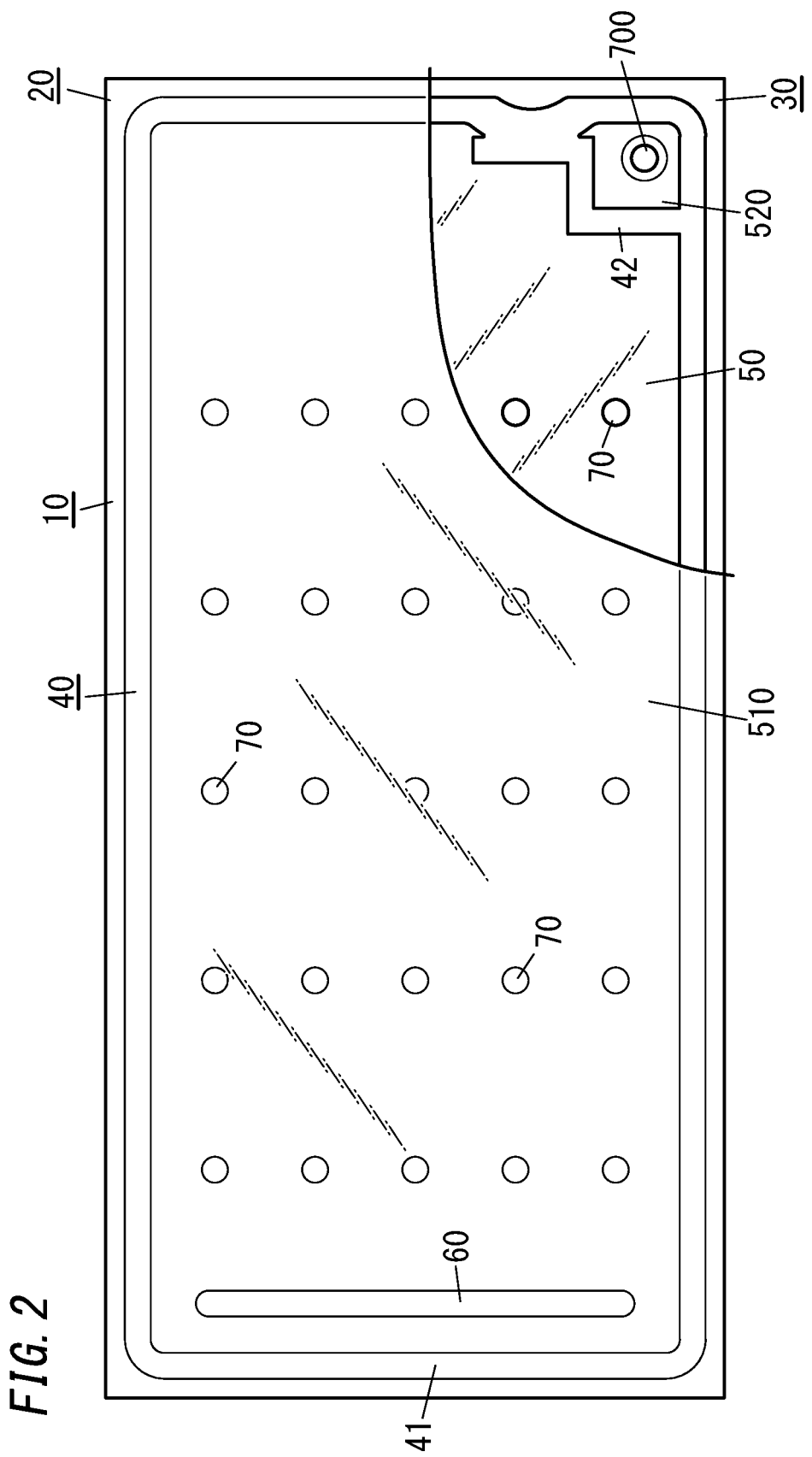
FIG. 2 is a partially cutaway plan view schematically illustrating the glass panel unit.

FIGS. 1 and 2 show a glass panel unit 10 of the first embodiment (finished product of a glass panel unit). The glass panel unit 10 of the first embodiment is a vacuum insulating glass unit. The vacuum insulating glass unit is a type of insulated glazing panels including at least a pair of glass panels and includes an evacuated space (or vacuum space) between the pair of glass panels.

The glass panel unit 10 of the first embodiment includes a first panel 20, a second panel 30, a seal 40, an evacuated space 50, a gas adsorbent 60, a plurality of pillars 70, and a closing member 80.

Figure 3:
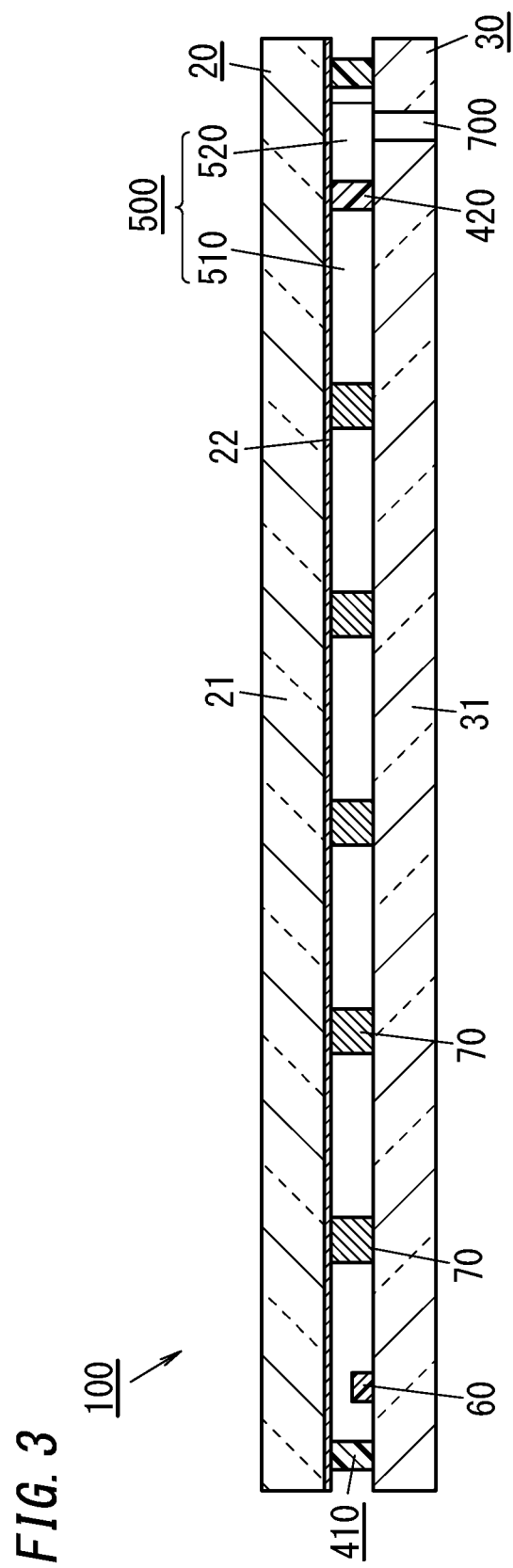
FIG. 3 is a vertical sectional view schematically illustrating a temporary assembly of the glass panel unit.
Figure 4:
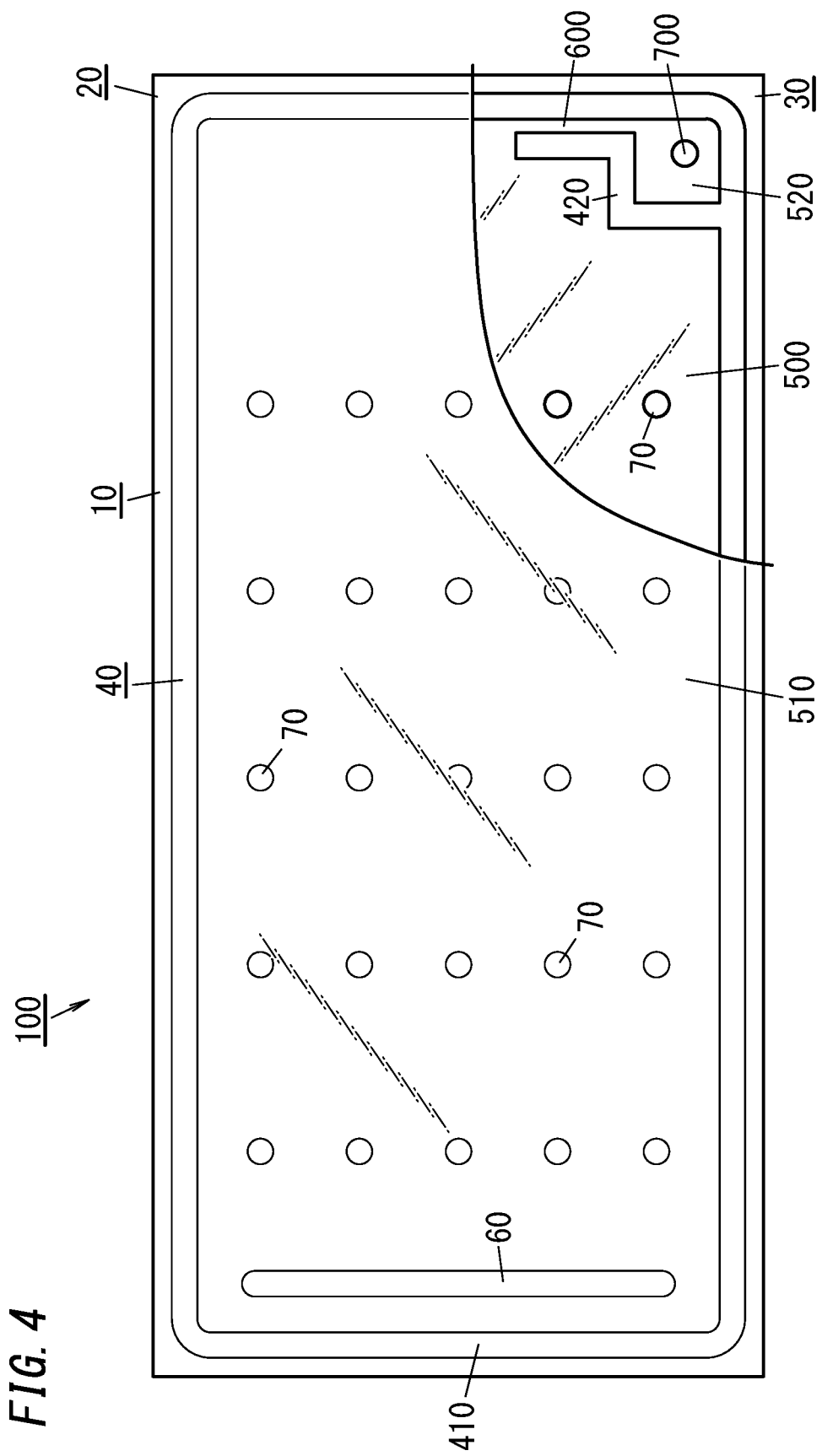
FIG. 4 is a partially cutaway plan view schematically illustrating the temporary assembly.

The glass panel unit (finished product) 10 is obtained by performing a prescribed process on a temporary assembly 100 shown in FIGS. 3 and 4.

The temporary assembly 100 includes the first panel 20, the second panel 30, a first portion 410 of a thermal adhesive, an internal space 500, a second portion 420 of the thermal adhesive, an evacuation path 600, an evacuation port 700, the gas adsorbent 60, and a plurality of pillars 70.

The first panel 20 includes a first glass pane 21 and a coating 22. The first glass pane 21 defines the planar shape of the first panel 20.

The first glass pane 21 is a rectangular flat plate and has a first surface (a lower surface in FIG. 3) and a second surface (an upper surface in FIG. 3) which are parallel to each other on both sides in a thickness direction of the first glass pane. The first surface and the second surface of the first glass pane 21 are flat surfaces. Examples of materials for the first glass pane 21 include soda-lime glass, high strain-point glass, chemically tempered glass, no-alkali glass, quartz glass, Neoceram, and physically tempered glass.

The coating 22 is formed on the first flat surface of the first glass pane 21. The coating 22 is an infrared reflective film. Note that the coating 22 is not limited to the infrared reflective film but may be a film having a desired physical property. Note that the first panel 20 may include only the first glass pane 21. In sum, the first panel 20 includes the first glass pane 21.

The second panel 30 includes a second glass pane 31 which defines the planar shape of the second panel 30. The second glass pane 31 is a rectangular flat plate and has a first surface (un upper surface in FIG. 3) and a second surface (a lower surface in FIG. 3) which are parallel to each other on both sides in a thickness direction of the second glass pane. The first surface and the second surface of the second glass pane 31 are flat surfaces.

The planar shape and the flat surface size of the second glass pane 31 are the same as those of the first glass pane 21 (that is, the planar shape of the second panel 30 is the same as that of the first panel 20). Moreover, the thickness of the second glass pane 31 is the same as that of, for example, the first glass pane 21. Examples of materials for the second glass pane 31 include soda-lime glass, high strain-point glass, chemically tempered glass, no-alkali glass, quartz glass, Neoceram, and physically tempered glass.

The second panel 30 includes only the second glass pane 31. That is, the second glass pane 31 is the second panel 30 itself. Note that a coating may be provided on any one of surfaces of the second panel 30. The coating is a film such as an infrared reflective film having a desired physical property. In this case, the second panel 30 includes the second glass pane 31 and the coating. In sum, the second panel 30 includes the second glass pane 31.

The second panel 30 is disposed to face the first panel 20. Specifically, the first panel 20 and the second panel 30 are disposed such that the first surface of the first glass pane 21 and the first surface of the second glass pane 31 are parallel to each other and face each other.

As illustrated in FIG. 3, the first portion 410 of the thermal adhesive is disposed between the first panel 20 and the second panel 30 to hermetically bond the first panel 20 and the second panel 30 together. Thus, the internal space 500 surrounded by the first portion 410, the first panel 20, and the second panel 30 is formed.

The first portion 410 is made of a thermal adhesive (a first thermal adhesive having a first softening point). The first thermal adhesive is, for example, glass frit. The glass frit is, for example, low-melting-point glass frit. Examples of the low-melting-point glass frit include bismuth-based glass frit, lead-based glass frit, and vanadium-based glass frit.

As illustrated in FIG. 4, the first portion 410 is disposed to have a rectangular frame shape in plan view. The first portion 410 is smaller than each of the first glass pane 21 and the second glass pane 31 in plan view. The first portion 410 is formed along an outer periphery of an upper surface of the second panel 30 (the first surface of the second glass pane 31). That is, the first portion 410 is formed to surround almost all area on the second panel 30 (the first surface of the second glass panel 31).

The first thermal adhesive of the first portion 410 is melted once at a predetermined temperature (first melting temperature) Tm1 (see FIG. 7) higher than or equal to the first softening point, thereby hermetically bonding the first panel 20 and the second panel 30 together via the first portion 410.

The second portion 420 of the thermal adhesive is disposed in the internal space 500. The second portion 420 partitions the internal space 500 into a hermetically sealed space, that is, a first space 510 serving as the evacuated space 50 hermetically closed when the glass panel unit 10 is completed and an evacuated space, that is, a second space 520 which is communicated with the evacuation port 700. The second portion 420 is formed such that the first space 510 is larger than the second space 520. The second portion 420 is disposed with a prescribed distance (e.g., 1 mm or 5 mm) from the first portion 410, and a portion between the first portion 410 and the second portion 420 serves as the evacuation path 600. Moreover, the second portion 420 has part whose distance to the first portion 410 is larger than the prescribed distance, and the second space 520 is formed between the part and the first portion 410.

The second portion 420 is made of a thermal adhesive (a second thermal adhesive having a second softening point).

The second thermal adhesive is, for example, glass frit. The glass frit is, for example, low-melting-point glass frit. Examples of the low-melting-point glass frit include bismuth-based glass frit, lead-based glass frit, and vanadium-based glass frit. The second thermal adhesive is the same as the first thermal adhesive, and the second softening point is equal to the first softening point.

The evacuation port 700 is a hole communicated with the second space 520 and an external space. The evacuation port 700 is used to evacuate the first space 510 through the second space 520 and the evacuation path 600. The evacuation port 700 is formed in the second panel 30 to be communicated with the second space 520 and the external space. Specifically, the evacuation port 700 is located at a corner of the second panel 30. Note that in the first embodiment, the evacuation port 700 is formed in the second panel 30, but the evacuation port 700 may be formed in the first panel 20 or the first portion 410.

The gas adsorbent 60 is disposed in the first space 510. Specifically, the gas adsorbent 60 has an elongated shape and is formed at an end in a longitudinal direction of the second panel 30 so as to extend along a short direction of the second panel 30. That is, the gas adsorbent 60 is disposed at an end of the first space 510 (evacuated space 50). In this way, the gas adsorbent 60 becomes less noticeable. Moreover, the gas adsorbent 60 is located at a location away from the second portion 420 and the evacuation path 600. Thus, when the first space 510 is evacuated, it is possible to suppress the gas adsorbent 60 from hindering the evacuation.

The gas adsorbent 60 is used to adsorb unnecessary gas (for example, remaining gas). The unnecessary gas is gas released from the first portion 410 and the second portion 420 when, for example, the first portion 410 and the second portion 420 are heated to the first melting temperature Tm1.

The gas adsorbent 60 contains a getter. The getter is a material having a property of adsorbing molecules smaller than a prescribed size. The getter is, for example, an evaporable getter. The evaporable getter has a property of releasing adsorbed molecules at or higher than a predetermined temperature (activation temperature). Thus, even when the adsorption capacity of the evaporable getter decreases, heating the evaporable getter to or higher than the activation temperature enables the adsorption capacity of the evaporable getter to be recovered. The evaporable getter is, for example, zeolite or ion-exchanged zeolite (e.g., copper ion-exchanged zeolite).

The gas adsorbent 60 contains powder of the getter. Specifically, the gas adsorbent 60 is formed by application of a solution containing powder of a getter dispersed therein. In this case, the gas adsorbent 60 can be downsized. Thus, even when the evacuated space 50 is small, the gas adsorbent 60 can be disposed.

The plurality of pillars 70 are used to maintain a prescribed space between the first panel 20 and the second panel 30. That is, the plurality of pillars 70 serve as spacers for maintaining the distance between the first panel 20 and the second panel 30 to have a desired value.

The plurality of pillars 70 are disposed in the first space 510. Specifically, the plurality of pillars 70 are arranged at respective intersections of a rectangular (square or oblong) grid. For example, the interval between each two of the plurality of pillars 70 is 2 cm. Note that sizes of the pillars 70, the number of the pillars 70, the interval between the pillars 70, and the arrangement pattern of the pillars 70 may be accordingly selected.

Each pillar 70 is made of a transparent material. Note that each pillar 70 may be made of a non-transparent material as long as it is sufficiently small. Materials for the pillars 70 are selected in an internal space forming step described later such that the pillars 70 are not deformed. For example, materials for each pillar 70 are selected to have a softening point (softening temperature) higher than the first softening point of the first thermal adhesive and the second softening point of the second thermal adhesive.

The temporary assembly 100 is subjected to the prescribed process to obtain the glass panel unit (finished product) 10.

In the prescribed process, the first space 510 is evacuated at a predetermined temperature (exhaust temperature) Te (see FIG. 8) via a passage including the evacuation path 600, the second space 520, and the evacuation port 700 and allowing gas to be exhausted to the external space, thereby realizing the evacuated space 50 from the first space 510. The exhaust temperature Te is higher than the activation temperature of the getter in the gas adsorbent 60. This concurrently enables evacuation of the first space 510 and recovery of the adsorption capacity of the getter.

Moreover, in the prescribed process, as illustrated in FIG. 2, the second portion 420 (see FIG. 4) is deformed to form a partition 42 that closes the evacuation path 600, thereby forming the seal 40 surrounding the evacuated space 50. Since the second portion 420 contains the second thermal adhesive, local heating is performed to once melt the second thermal adhesive to deform the second portion 420 so as to form the partition 42.

As illustrated in FIG. 2, the second portion 420 is deformed to close the evacuation path 600. The partition 42 obtained by thus deforming the second portion 420 spatially separates the evacuated space 50 from the second space 520. The seal 40 surrounding the evacuated space 50 is constituted by a portion 41 corresponding to the evacuated space 50 and the partition 42.

As illustrated in FIG. 2, the glass panel unit (finished product) 10 thus obtained includes the first panel 20, the second panel 30, the seal 40, the evacuated space 50, the second space 520, the gas adsorbent 60, the plurality of pillars 70, and the closing member 80.

As described above, the evacuated space 50 is formed by evacuating the first space 510 through the second space 520 and the evacuation port 700. In other words, the evacuated space 50 is the first space 510 in which the degree of vacuum is lower than or equal to a prescribed value. The prescribed value is, for example, 0.1 Pa. The evacuated space 50 is fully hermetically sealed with the first panel 20, the second panel 30, and the seal 40 and is thus separated from the second space 520 and the evacuation port 700.

The seal 40 fully surrounds the evacuated space 50 and hermetically bonds the first panel 20 and the second panel 30 together. The seal 40 has a frame shape and includes the portion 41 corresponding to the evacuated space 50 and the partition 42. The portion 41 corresponding to the evacuated space 50 is, in other words, a portion facing the evacuated space 50. The partition 42 is a partition obtained by deforming the second portion 420.

The closing member 80 reduces objects such as dust entering through the evacuation port 700 into the second space 520. In the first embodiment, the closing member 80 is a cover 81 provided on a front side of the evacuation port 700 formed in the first panel 20 or the second panel 30.

Providing the closing member 80 to the evacuation port 700 reduces objects such as dust entering through the evacuation port 700 into the second space 520. This reduces degradation of the appearance of the glass panel unit 10 due to objects such as dust entering through the evacuation port 700 into the second space 520. Note that the closing member 80 does not have to be provided.

Next, a method for manufacturing the glass panel unit 10 according to the first embodiment will be described with reference to FIGS. 5 and 8.

The method for manufacturing the glass panel unit 10 of the first embodiment includes at least an adhesive disposing step, a glass composite generation step, an internal space forming step, an evacuation step, and an evacuated space forming step. Note that another step may be optionally included. The steps will be described in order below.

Although not shown in the figure, in the first embodiment, the substrate forming step is executed at first. The substrate forming step is a step of forming the first panel 20 and the second panel 30. Specifically, in the substrate forming step, for example, the first panel 20 and the second panel 30 are formed. Moreover, in the substrate forming step, the first panel 20 and the second panel 30 are washed as necessary.

Next, a step of forming the evacuation port 700 is performed. In this step, the evacuation port 700 is formed in the second panel 30. Note that the evacuation port 700 may be formed in the first panel 20 or may be formed in the first portion 410 of the thermal adhesive. That is, the evacuation port 700 is formed in at least any one of the first panel 20, the second panel 30, or the first portion 410.

Figure 5:
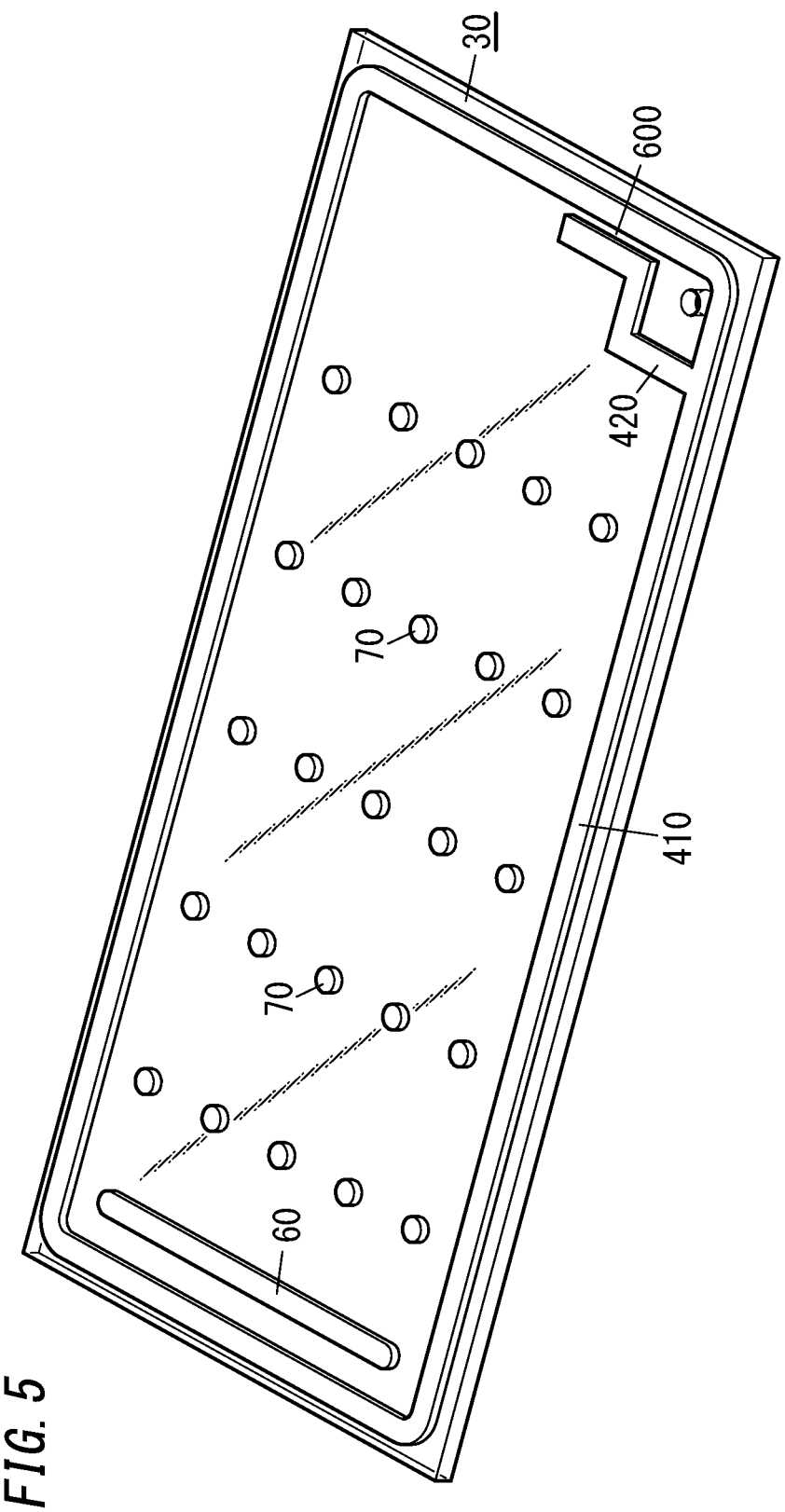
FIG. 5 is a view illustrating a method for manufacturing the glass panel unit.

Next, as illustrated in FIG. 5, the adhesive disposing step is performed. The adhesive disposing step is a step of disposing the thermal adhesive (the first portion 410 and the second portion 420) on the first panel 20 or the second panel 30. Specifically, in the adhesive disposing step, the first portion 410 and the second portion 420 are formed on the second panel 30. In the adhesive disposing step, the material (first thermal adhesive) for the first portion 410 and a material (second thermal adhesive) for the second portion 420 are applied to the second panel 30 (the first surface of the second glass pane 31) with, for example, a dispenser.

Note that in the adhesive disposing step, the material for the first portion 410 and the material for the second portion 420 may be dried and pre-sintered. For example, the second panel 30, on which the material for the first portion 410 and the material for the second portion 420 have been applied, is heated. Note that the first panel 20 may be heated together with the second panel 30. That is, the first panel 20 may be heated under the same condition as the condition for the second panel 30. Thus, the difference between the warp of the first panel 20 and the warp of the second panel 30 can be reduced.

Next, the pillar forming step is performed. Specifically, in the pillar forming step, the plurality of pillars 70 are formed in advance, and the plurality of pillars 70 are arranged at respective prescribed positions on the second panel 30 with, for example, a chip mounter. Note that the plurality of pillars 70 may be formed by a photolithography technique and an etching technique. In this case, the plurality of pillars 70 are made of, for example, a photocurable material. Alternatively, the plurality of pillars 70 may be formed by a well-known thin film forming technique.

Next, the gas adsorbent forming step is performed. Specifically, in the gas adsorbent forming step, a solution containing powder of the getter dispersed therein is applied to prescribed positions on the second panel 30 and is dried to form the gas adsorbent 60. Note that the order of the adhesive disposing step, the pillar forming step, and the gas adsorbent forming step is arbitrary.

Figure 6:
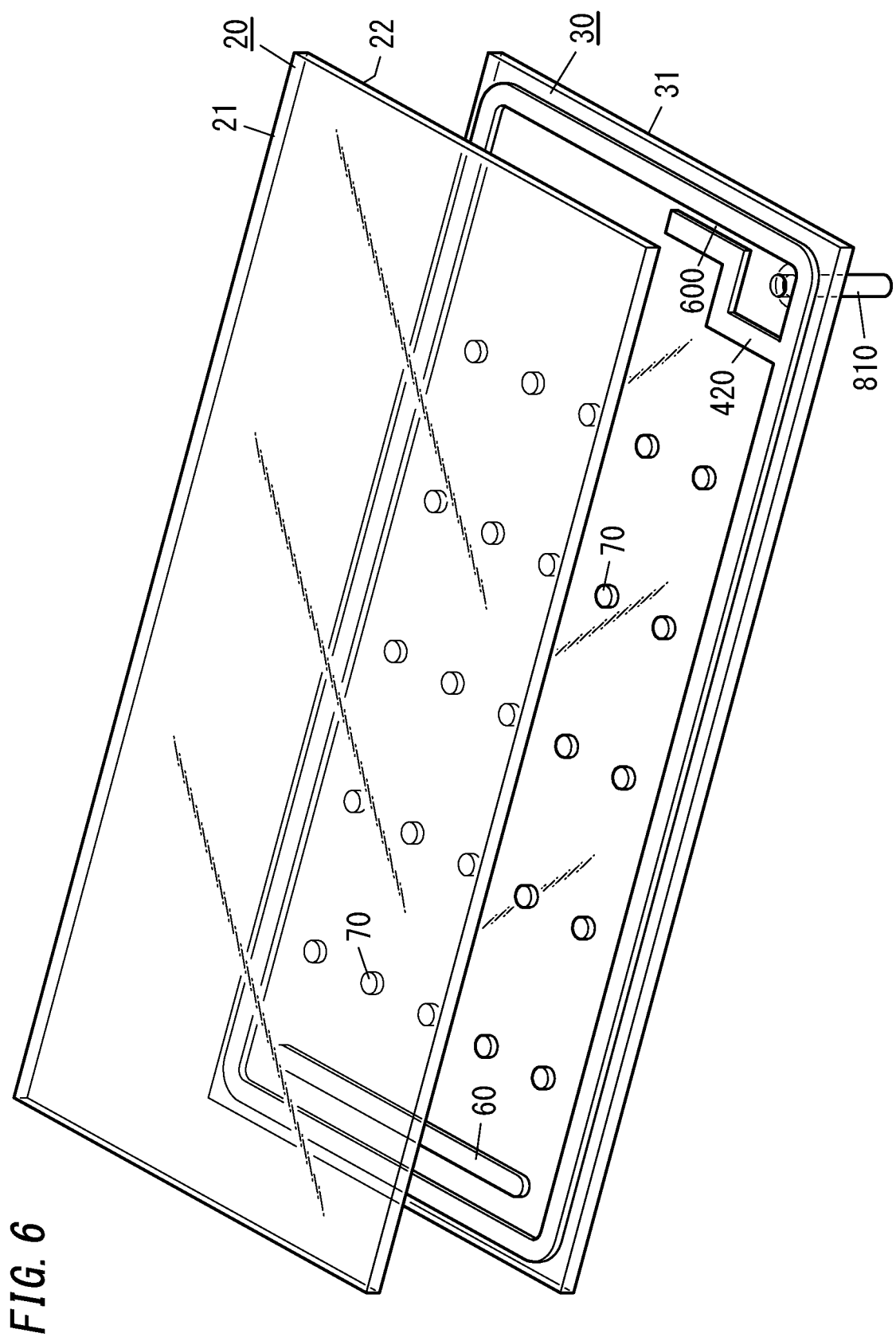
FIG. 6 is a view illustrating the method for manufacturing the glass panel unit.

Next, the glass composite generation step is performed. As illustrated in FIG. 6, the glass composite generation step is a step of disposing the second panel 30 to face the first panel 20 to generate a glass composite. The glass composite includes the first panel 20, the second panel 30, and the thermal adhesive (the first portion 410 and the second portion 420).

The first panel 20 and the second panel 30 are disposed and stacked on one another such that the first surface of the first glass pane 21 and the first surface of the second glass pane 31 are parallel to each other and face each other. The thermal adhesive is in contact with the first panel 20 and the second panel 30, thereby forming the glass composite.

The glass composite has the evacuation port 700 and the evacuation path 600 located between the first portion 410 and the second portion 420 and extending to the evacuation port 700. The evacuation path 600 is communicated with the external space and the internal space 500 via the evacuation port 700. It is possible to vent between the external space and the internal space 500 via the evacuation path 600 and the evacuation port 700.

Next, the internal space forming step is performed. The internal space forming step is a step of heating the glass composite to melt the thermal adhesive so as to form an internal space 500 surrounded by the first panel 20, the second panel 30, and a melted substance of the thermal adhesive except for the evacuation port 700. Specifically, in the internal space forming step, the first panel 20 and the second panel 30 are bonded together, thereby preparing the temporary assembly 100. That is, the internal space forming step is a step of hermetically bonding the first panel 20 and the second panel 30 together via the first portion 410 and the second portion 420.

Figure 7:
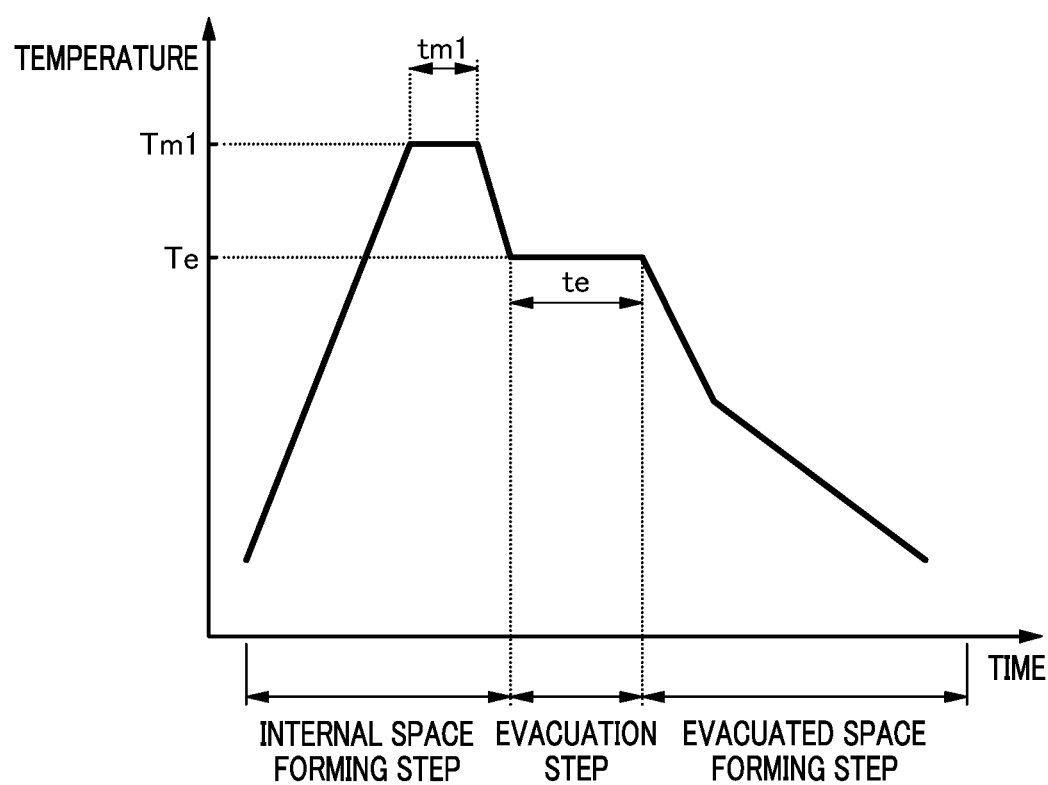
FIG. 7 is a view illustrating a temperature change in the method for manufacturing the glass panel unit.

In the internal space forming step, the first thermal adhesive is melted at a predetermined temperature (first melting temperature) Tm1 higher than or equal to the first softening point to hermetically bond the first panel 20 and the second panel 30 together. Specifically, the glass composite is disposed in a melting furnace and are heated as illustrated in FIG. 7, at the first melting temperature Tm1 for a predetermined time (first melting time) tm1.

The first melting temperature Tm1 and the first melting time tm1 are determined such that the first panel 20 and the second panel 30 are hermetically bonded together via the first portion 410 and the second portion 420 but the evacuation path 600 is not closed with the second portion 420. That is, the lower limit of the first melting temperature Tm1 is the first softening point, but the upper limit of the first melting temperature Tm1 is determined such that the evacuation path 600 is not closed with the second portion 420. For example, when each of the first softening point and the second softening point is 290° C., the first melting temperature Tm1 is set to 300° C. Moreover, the first melting time tm1 is, for example, 10 minutes. Note that in the internal space forming step, gas is released from the first portion 410 and the second portion 420, but the gas is adsorbed on the gas adsorbent 60.

Figure 8:
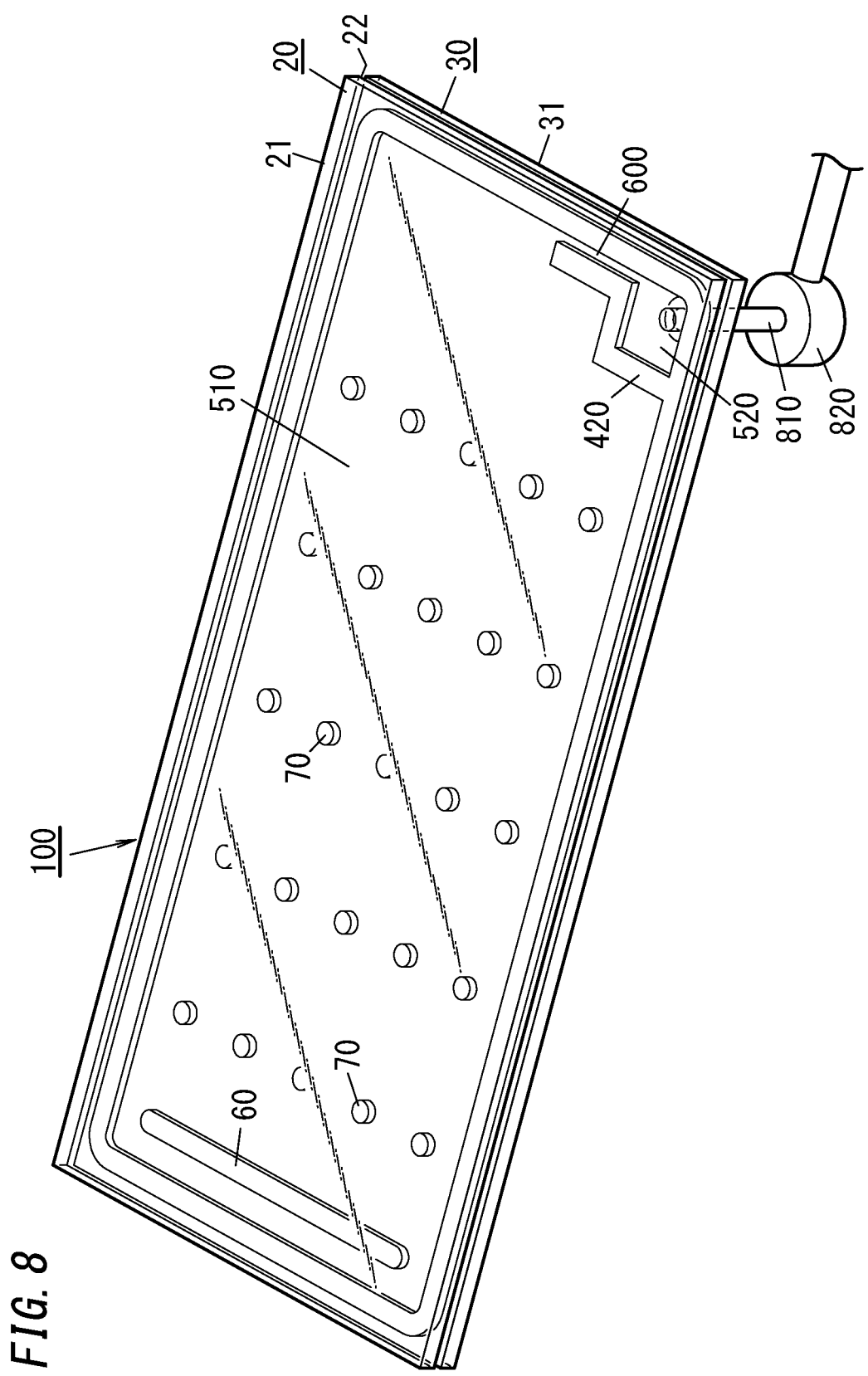
FIG. 8 is a view illustrating the method for manufacturing the glass panel unit.
Figure 9A:
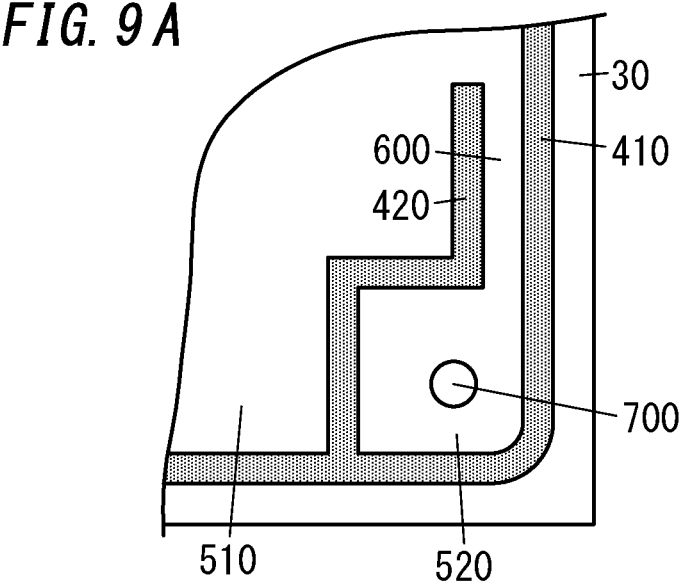
FIG. 9A is a horizontal sectional view of a main part of the glass panel unit, the horizontal sectional view illustrating an evacuated space forming step in the method for manufacturing the glass panel unit.
Figure 9B:
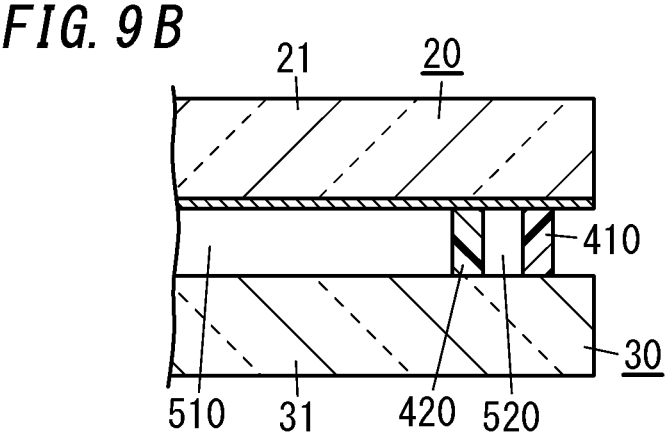
FIG. 9B is a vertical sectional view of the main part, the vertical sectional view illustrating the evacuated space forming step.
Figure 10A:
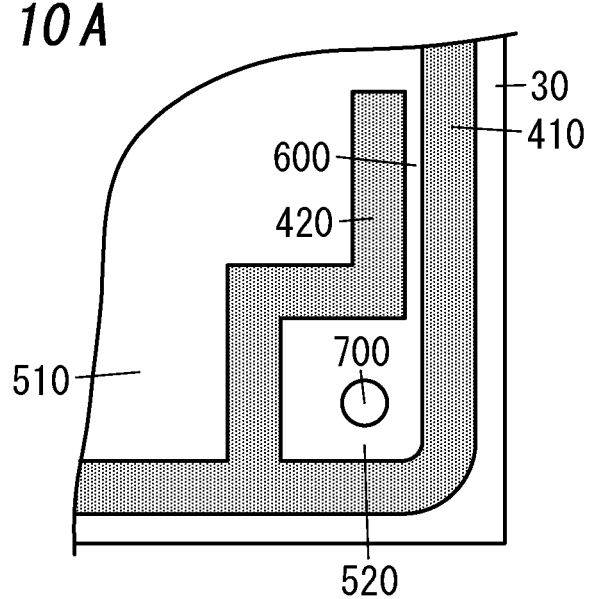
FIG. 10A is a horizontal sectional view of the main part, the horizontal sectional view illustrating the evacuated space forming step.
Figure 10B:
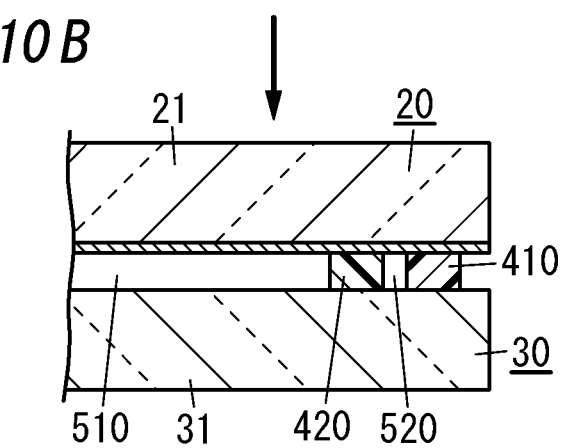
FIG. 10B is a vertical sectional view of the main part, the vertical sectional view illustrating the evacuated space forming step.

In the internal space forming step, the first portion 410 and the second portion 420 before being softened shown in FIGS. 9A and 9B are softened into a state shown in FIGS. 10A and 10B. The softened first portion 410 and second portion 420 bonds the first panel 20 and the second panel 30 together. In this way, the temporary assembly 100 shown in FIG. 8 is obtained.

Next, the evacuation step is performed. The evacuation step is a step of exhausting gas from the internal space 500 to evacuate the internal space 500. Specifically, the evacuation step is a step of evacuating the first space 510 at a predetermined temperature (the exhaust temperature) Te through the evacuation path 600, the second space 520, and the evacuation port 700.

As illustrated in FIG. 8, the evacuation is performed with, for example, a vacuum pump. The vacuum pump is connected via an exhaust pipe 810 and a seal head 820 to the temporary assembly 100. The exhaust pipe 810 is bonded to the second panel 30, for example, such that the interior of the exhaust pipe 810 is in communication with the evacuation port 700. Then, the seal head 820 is attached to the exhaust pipe 810, thereby connecting an inlet of the vacuum pump to the evacuation port 700. The exhaust pipe 810 is bonded to the second panel 30 at least before the internal space forming step.

In the internal space forming step, as illustrated in FIG. 7, the first space 510 is evacuated at the exhaust temperature Te for a predetermined time (exhaust time) te through the evacuation path 600, the second space 520, and the evacuation port 700.

The exhaust temperature Te is set to be higher than the activation temperature (e.g., 240° C.) of the getter in the gas adsorbent 60 and lower than the first softening point and the second softening point (e.g., 290° C.). For example, the exhaust temperature Te is 250° C.

In this way, the first portion 410 and the second portion 420 are not deformed. Moreover, the getter in the gas adsorbent 60 is activated, and molecules (gas) adsorbed on the getter is released from the getter. Then, the molecules (i.e., gas) released from the getter is discharged through the first space 510, the evacuation path 600, the second space 520, and the evacuation port 700. Thus, in the internal space forming step, the adsorption capacity of the gas adsorbent 60 is recovered.

The exhaust time te is set such that the evacuated space 50 having a desired degree of vacuum (e.g., degree of vacuum of lower than or equal to 0.1 Pa). For example, the exhaust time te is set to 120 minutes.

Next, the evacuated space forming step is performed. The reduced-pressure space forming step is a step of sealing the internal space 500 to form the evacuated space 50 hermetically closed.

In the evacuated space forming step, while the internal space is kept in an evacuated state, part of at least one of the first portion 410 or the second portion 420 is heated and force is applied to deform the part, thereby closing the evacuation path 600.

Specifically, in the first embodiment, the evacuated space forming step is a step of deforming the first portion 410 to close the evacuation path 600 to form the partition 42 (see FIG. 2) surrounding the evacuated space 50. In the evacuated space forming step, the first portion 410 is locally heated to a predetermined temperature (second melting temperature) higher than or equal to the second softening point. For the local heating, for example, an irradiator configured to output a laser beam is used. The irradiator is configured to externally irradiate the first portion 410 with a laser beam through the second panel 30. Note that for the local heating, a device other than the irradiator may be used, and a method for performing the local heating is not limited.

In the first embodiment, exhaustion with a vacuum pump similar to the exhaustion performed in the evacuation step is continued also in the evacuated space forming step. Note that in the evacuated space forming step, the exhaustion with a vacuum pump similar to the exhaustion performed in the evacuation step does not have to be continued, but the degree of vacuum is at least maintained.

Figure 11A:
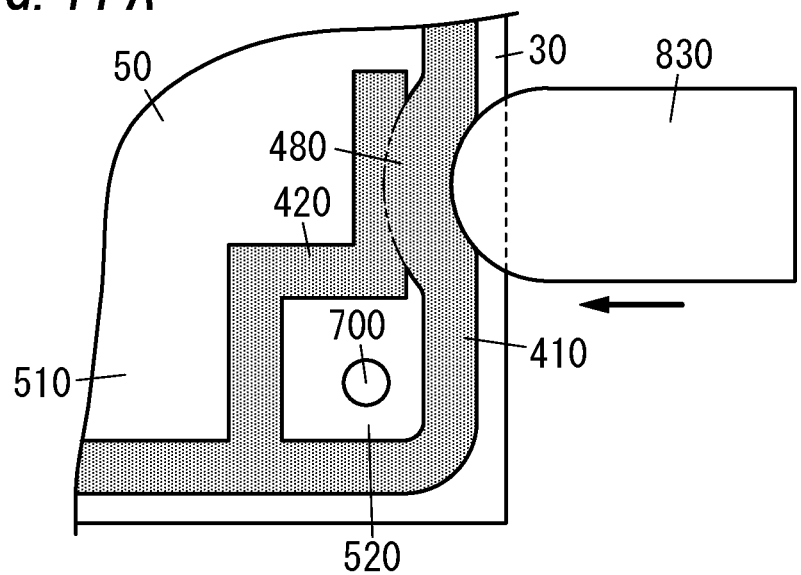
FIG. 11A is a horizontal sectional view of the main part, the horizontal sectional view illustrating the evacuated space forming step.
Figure 11B:
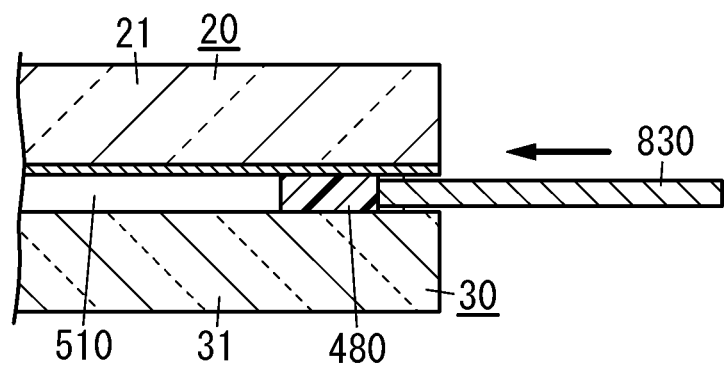
FIG. 11B is a vertical sectional view of the main part, the vertical sectional view illustrating the evacuated space forming step.

When from a state shown in FIGS. 10A and 10B, the first portion 410 is heated to a temperature higher than or equal to the first softening point, the first portion 410 is softened and becomes easy to deform. In this state, as illustrated in FIGS. 11A and 11B, a jig 830 is inserted between the first panel 20 and the second panel 30. When the jig 830 pushes the first portion 410 toward the second portion 420, the first portion 410 comes into contact with the second portion 420, thereby forming a closed part 480 that closes the evacuation path 600. Thus, the internal space 500 is sealed, and the evacuated space 50 hermetically closed is formed.

In the first embodiment, to hermetically sealing the internal space 500 to form the evacuated space 50, parts of the first portion 410 and the second portion 420 are locally heated. In this case, the quantity of gas released is less than that in a case where the entirety of the first portion 410 and the second portion 420 are heated and unnecessary gas is released from the entirety of the first portion 410 and the second portion 420. As a result, it becomes easy to improve the degree of vacuum of the evacuated space 50 (that is, to reduce the pressure in the evacuated space 50).

Note that in the first embodiment, in the evacuated space forming step, the jig 830 applies force to part of the first portion 410 to deform the first portion 410. In contrast, in the evacuated space forming step, force resulting from atmospheric pressure may be applied to part of the first portion 410 or the second portion 420 without using the jig 830 to deform the part to close the evacuation path 600. In this case, the jig 830 is no longer necessary, and the evacuated space forming step is performable with a simple configuration.

Next, a method for manufacturing a glass panel unit 10 according to a second embodiment will be described with reference to FIGS. 12, 13A, 13B, and 13C. Note that the method for manufacturing the glass panel unit 10 of the second embodiment is for the most part the same as the method for manufacturing the glass panel unit 10 of the first embodiment. Thus, description similar to the description in the first embodiment is omitted, and differences are mainly described.

Figure 13A:
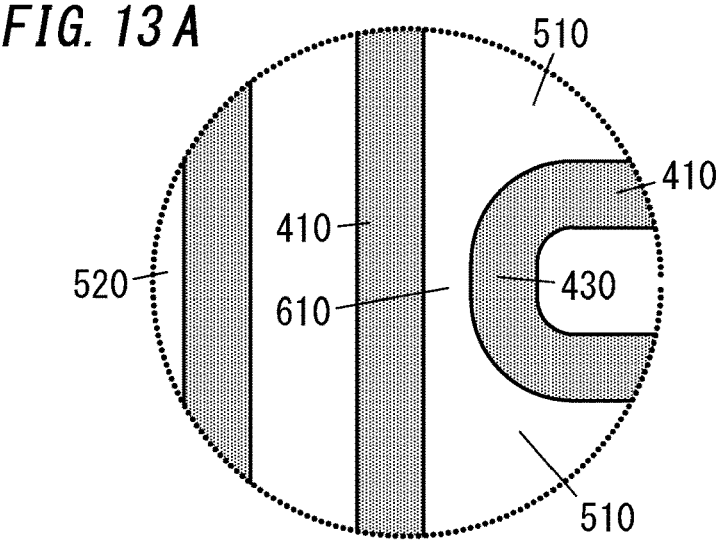
FIG. 13A is a vertical sectional view illustrating a main part of the glass panel unit, the vertical sectional view illustrating an evacuated space forming step in a method for manufacturing the glass panel unit of the second embodiment.
Figure 13B:
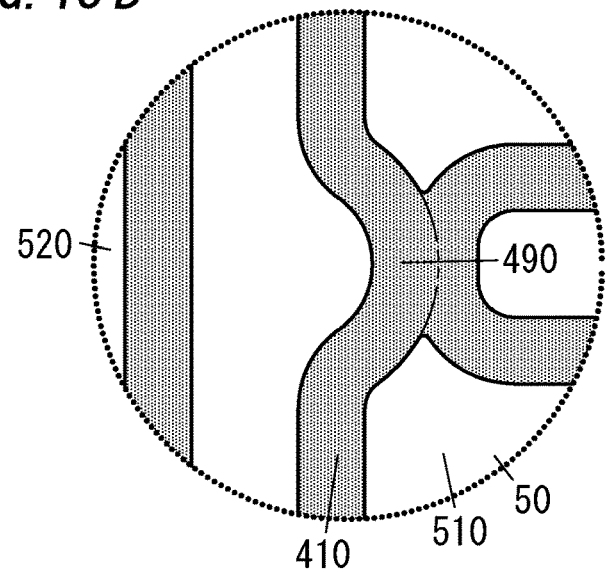
FIG. 13B is a vertical sectional view of the main part, the vertical sectional view illustrating the evacuated space forming step.

As illustrated in FIG. 13A, in the method for manufacturing the glass panel 10 of the second embodiment, a glass composite has one or a plurality of ventilation path 610 between a first portion 410 and a third portion 430 of a thermal adhesive. In an evacuated space forming step, part of at least any one of the first portion 410 or the third portion 430 is heated, and force is applied to the part to deform the part, thereby closing the ventilation path 610 as illustrated in FIG. 13B. Thus, in the evacuated space forming step, an internal space 500 is divided into a plurality of evacuated spaces 50.

Figure 12:
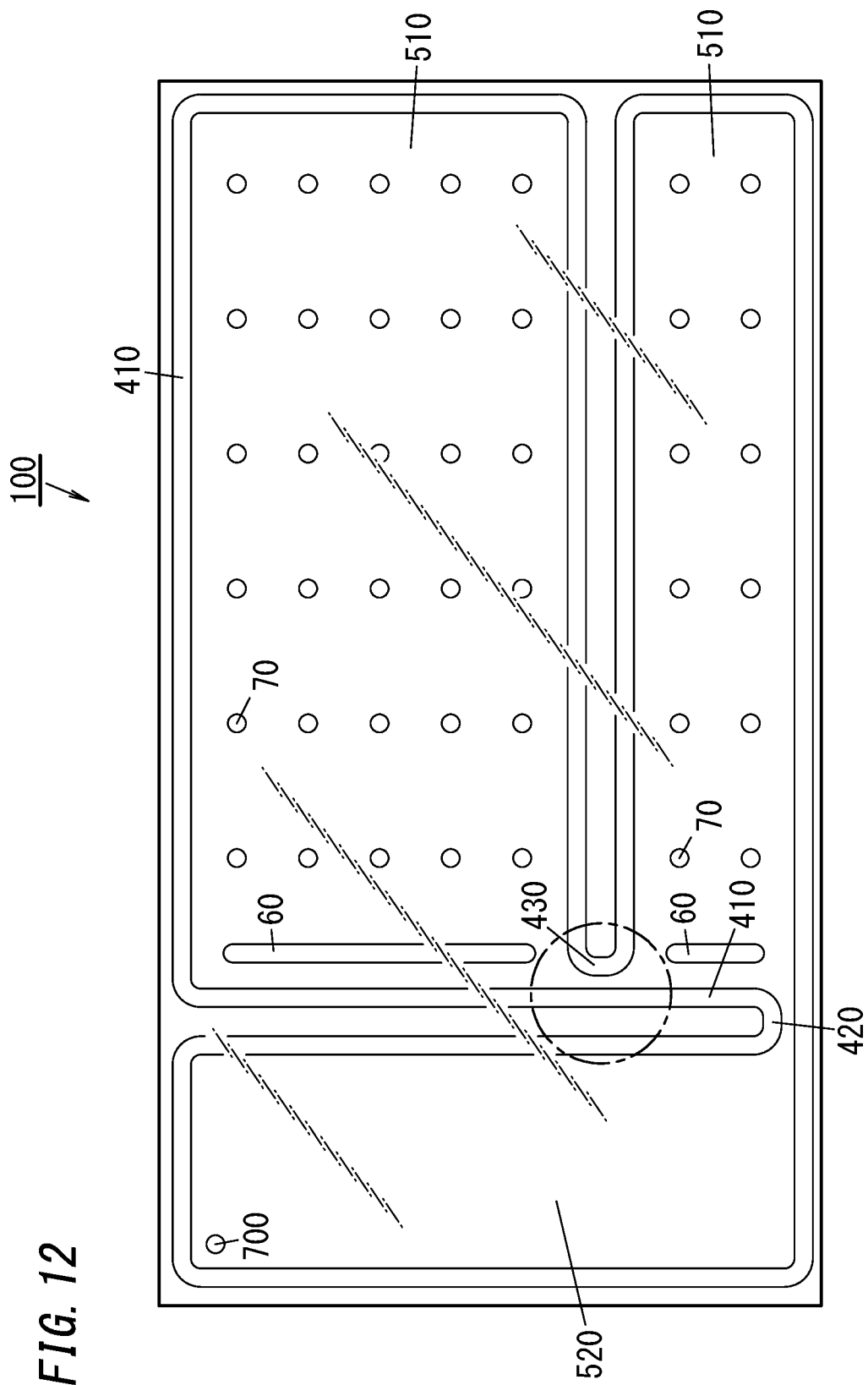
FIG. 12 is a plan view schematically illustrating a glass panel unit of a second embodiment.

Specifically, in an adhesive disposing step, the first portion 410, a second portion 420, and the third portion 430 of the thermal adhesive are disposed as illustrated in FIG. 12. In the evacuated space forming step, part of the first portion 410 is locally heated, and force resulting from atmospheric pressure is applied to the part. Thus, as illustrated in FIG. 13B, the part of the first portion 410 is deformed to form a closed part 490 to close an evacuation path 600. In this case, the internal space 500 may be divided into the plurality of evacuated spaces 50, and a plurality of glass panel units 10 each having the evacuated space 50 is obtainable from one glass panel unit 10.

Figure 13C:
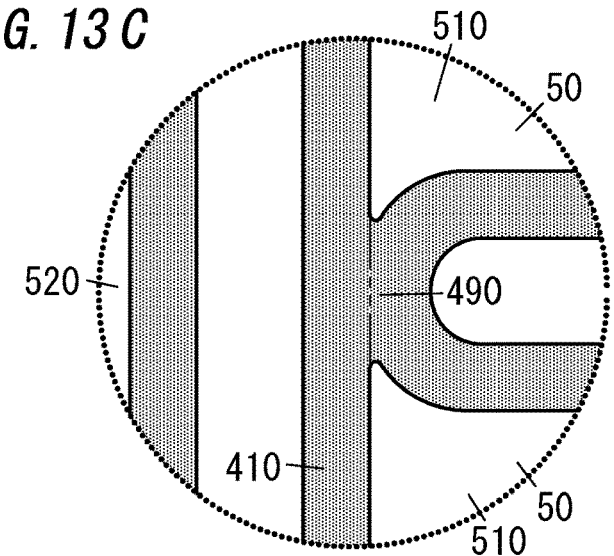
FIG. 13C is a vertical sectional view illustrating the main part, the vertical sectional view illustrating a variation of the evacuated space forming step.

Note that at this time, instead of locally heating the part of the first portion 410, the third portion 430 may be locally heated. In this case, as illustrated in FIG. 13C, part of the third portion 430 is deformed to form the closed part 490 to close the evacuation path 600.

Figure 14:
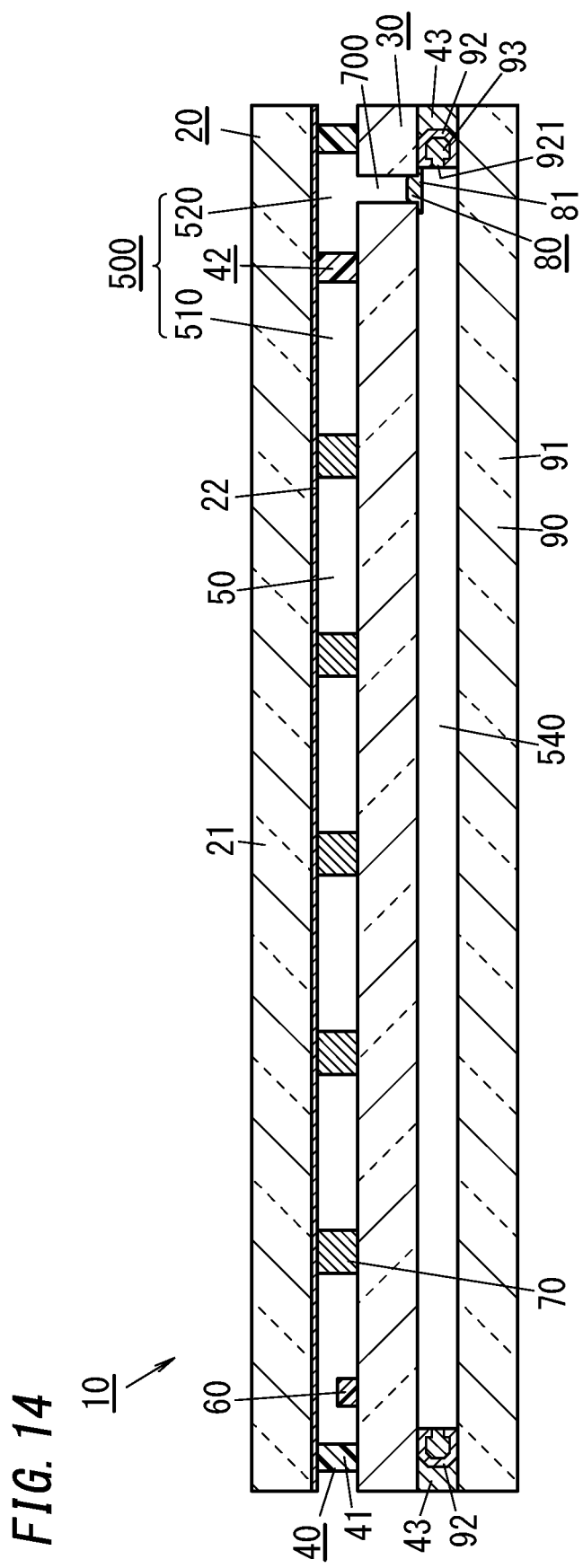
FIG. 14 is a vertical sectional view schematically illustrating a glass panel unit of a third embodiment of the present invention.
Figure 15:
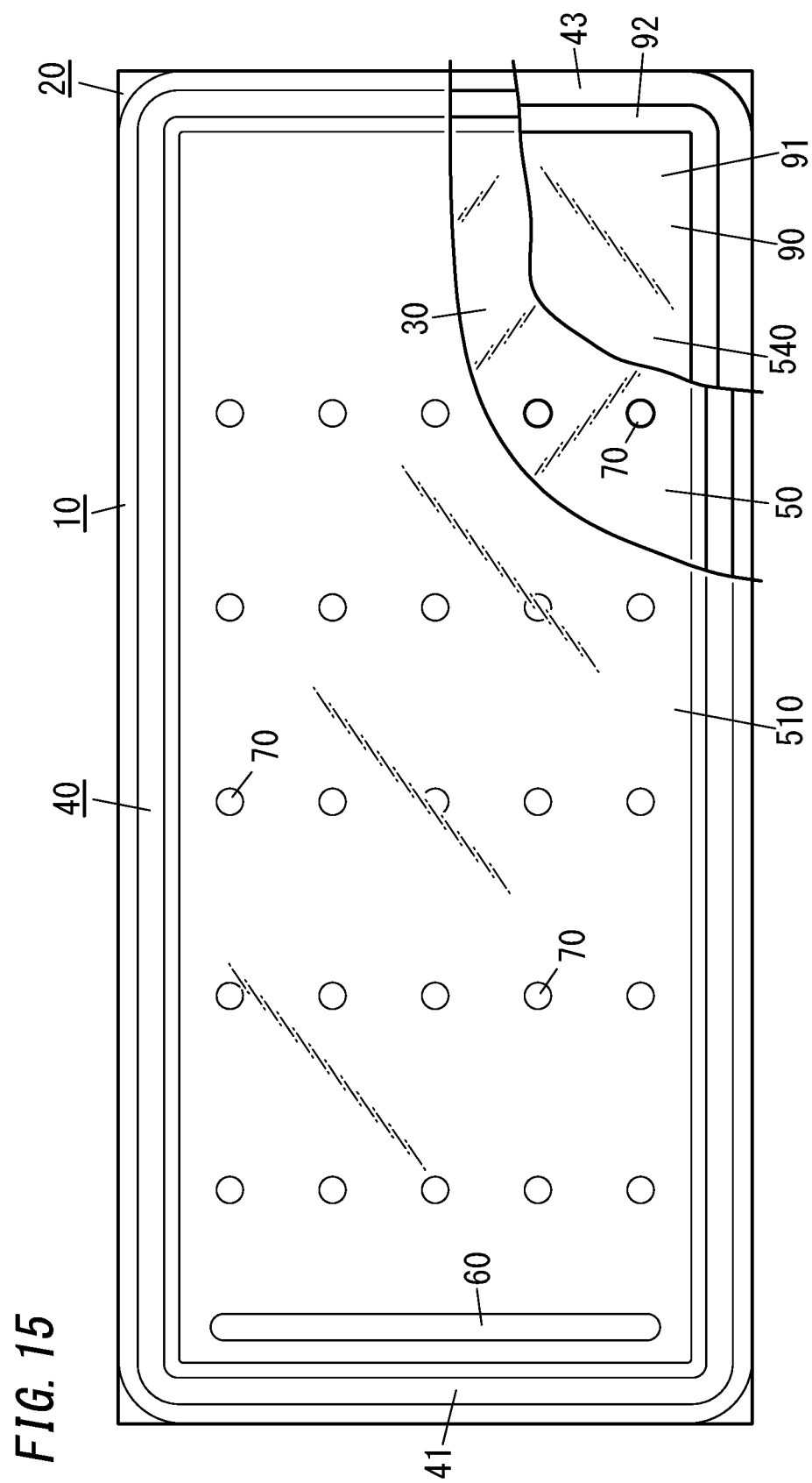
FIG. 15 is a partially cutaway plan view schematically illustrating the glass panel unit of the third embodiment.

Next, a glass panel unit 10 of a third embodiment will be described with reference to FIGS. 14 and 15. Note that the glass panel unit 10 according to the third embodiment includes components in addition to the components in the first embodiment or the second embodiment.

The method for manufacturing the glass panel unit 10 of the third embodiment further includes a second internal space forming step. The second internal space forming step includes disposing: a third panel 90 including a third glass pane 91 and; a third thermal adhesive between the third panel 90 and either a first panel 20 or a second panel 30. Then, in the second internal space forming step, a second internal space 540 surrounded by the third panel 90, the first panel 20 or the second panel 30, and the third thermal adhesive is formed.

The glass panel unit 10 of the third embodiment includes the third panel 90 disposed to face the second panel 30. Note that in the third embodiment, the third panel 90 faces, for the sake of convenience, the second panel 30 but may face the first panel 20.

The third panel 90 includes a third glass pane 91. The third glass pane 91 included in the third panel 90 has a flat surface and a predetermined thickness. In the third embodiment, the third glass pane 91 constitutes the third panel 90.

Note that a coating may be provided on any one of surfaces of the third panel 90. The coating is a film such as an infrared reflective film having a desired physical property. In this case, the third panel 90 includes the third glass pane 91 and the coating. In sum, the third panel 90 includes the third glass pane 91.

Moreover, the glass panel unit 10 includes a second seal 43 disposed between the second panel 30 and the third panel 90 to hermetically bond the second panel 30 and the third panel 90 together. Note that in this case, a seal 40 is a first seal. The second seal 43 is disposed to have an annular shape between a peripheral portion of the second panel 30 and a peripheral portion of the third panel 90. The second seal 43 may be made of a material similar to or different from that for the seal 40.

The glass panel unit 10 has the second internal space 540 surrounded by and hermetically closed with the second panel 30, the third panel 90, and the second seal 43 and filled with a drying gas. Note that in this case, an internal space 500 is a first internal space. As the drying gas, a noble gas such as argon, dry air, or the like is used but is not limited to this example.

Moreover, on an inner side of the second seal 43 between the peripheral portion of the second panel 30 and the peripheral portion of the third panel 90, a frame member 92 having a hollow is disposed to have an annular shape. The frame member 92 has a through hole 921 which is in communication with the second internal space 540 and in which desiccant 93 such as silica gel is accommodated.

The second panel 30 and the third panel 90 may be bonded together in a similar manner to bonding of the first panel 20 and the second panel 30 together. An example of the second internal space forming step will be described below.

First, the third panel 90 and an assembly element (the glass panel unit 10 in the first embodiment or the second embodiment) including the first panel 20 and the second panel 30 are prepared.

Next, between the third panel 90 and the first panel 20 or the second panel 30, the third thermal adhesive which is to serve as the second seal 43 later is disposed. Specifically, the third thermal adhesive is disposed on a peripheral portion of a surface of the third panel 90 or the second panel 30 (second thermal adhesive disposing step). Third thermal adhesive may be made of a material similar to or different from a thermal adhesive (first thermal adhesive) which is to serve as a first portion 410. In this step, an evacuation path (second evacuation path) as a through hole through which the second internal space 540 and the external space are communicated with each other is formed in the third thermal adhesive.

Then, the third panel 90 and the second panel 30 are disposed to face each other (third panel opposite disposition step).

Next, a temperature is increased to a melting temperature of the thermal adhesive which is to serve as the second seal 43 to once melt the thermal adhesive, thereby hermetically bonding the second panel 30 and the third panel 90 together via the second seal 43 (bonding step). Note that at this time, the second evacuation path is not fully closed.

Then, a drying gas is introduced into the second internal space 540 through the second evacuation path (drying gas feeding step). In this step, the second internal space 540 may be fully filled with only the drying gas, or air may be left in the second internal space 540. Note that the drying gas feeding step may be omitted.

Then, the second seal 43 is heated to close the second evacuation path so as to seal up the second internal space 540 (second space sealing step). Thus, the second internal space forming step ends.

Thus, the glass panel unit 10 is formed. The glass panel unit 10 of the third embodiment provides a further improved thermal insulation property.

Figure 16:
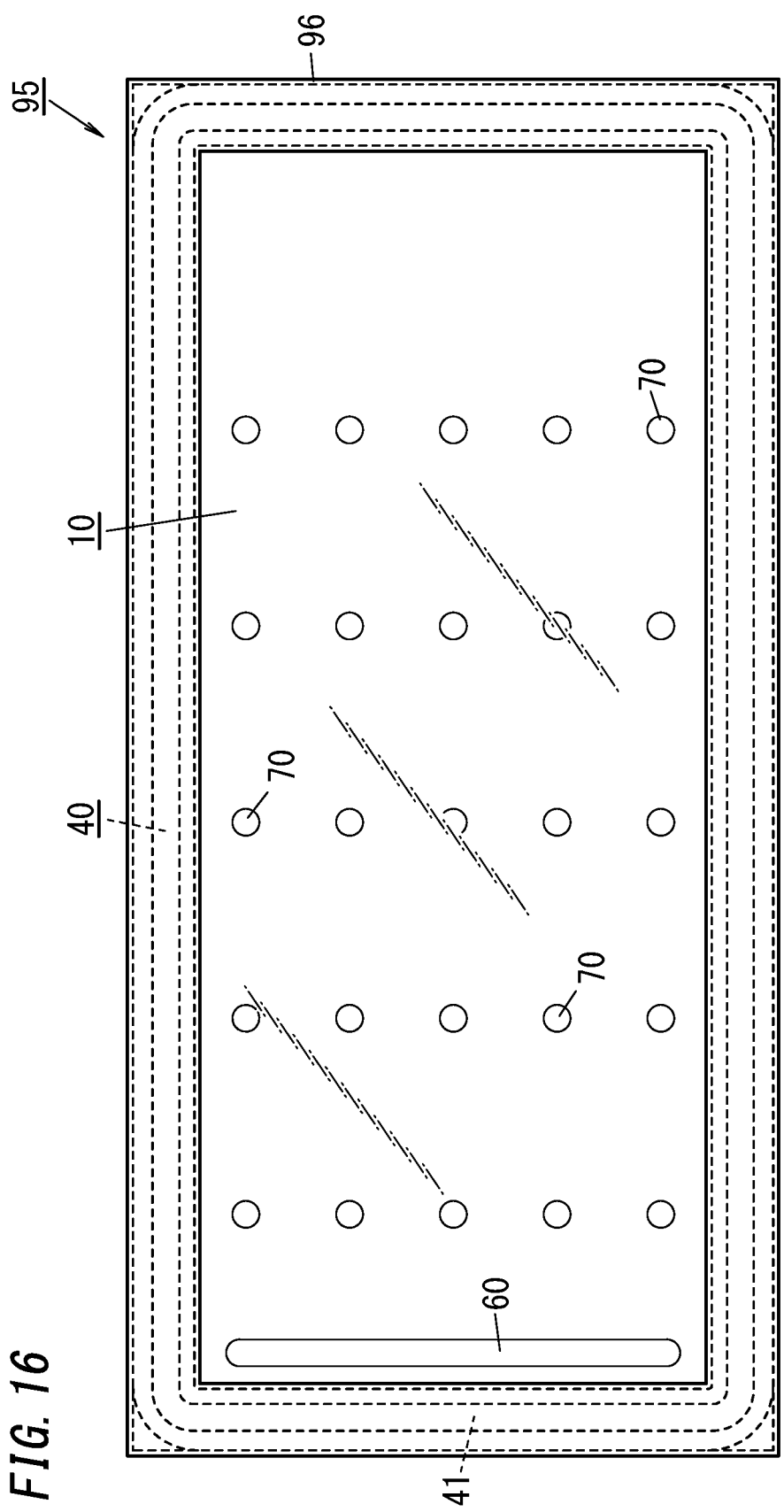
FIG. 16 is a plan view schematically illustrating a glass window including a glass panel unit of a fourth embodiment of the present invention.

Next, a fourth embodiment will be described with reference to FIG. 16. Note that the fourth embodiment is a glass window 95 including the glass panel unit 10 of any one of the first to third embodiments.

In the fourth embodiment, a glass panel unit 10 similar to that of any of the first to third embodiments is used. The method for manufacturing the glass window 95 in the fourth embodiment further includes a step of fitting the glass panel unit 10 manufactured in any of the first to third embodiments in a window frame 96 to manufacture the glass window 95.

Specifically, the peripheral portion of the glass panel unit 10 is fit in the window frame 96 having a U-shaped cross section, thereby forming the glass window 95.

The glass window 95 of the fourth embodiment provides a further improved thermal insulation property.

In the embodiments (i.e., the first to the fourth embodiments; the same applies to the following description), the glass panel unit 10 has a rectangular shape, but the glass panel unit 10 may have a desired shape such as a round shape or a polygonal shape. That is, the first panel 20, the second panel 30, and the seal 40 do not have to have a rectangular shape but may have a desired shape such as a round shape or a polygonal shape. Note that the shape of each of the first panel 20, the second panel 30, the portion 41 corresponding to the evacuated space 50, and the partition wall 42 is not limited to the shape in the embodiments but may be a shape that provides a glass panel unit 10 having a desired shape. Note that the shape or the size of the glass panel unit 10 is determined based on the application of the glass panel unit 10.

Moreover, the first surface and the second surface of the first glass pane 21 of the first pane 20 are not limited to flat surfaces. Similarly, the first surface and the second surface of the second glass pane 31 of the second panel 30 are not limited to flat surfaces.

Moreover, the first glass pane 21 of the first panel 20 and the second glass pane 31 of the second panel 30 do not have to have the same planar shape and the same flat surface size.

Further, the first glass pane 21 and the second glass pane 31 do not have to have the same thickness. Furthermore, the first glass pane 21 and the second glass pane 31 do not have to be made of the same material.

Moreover, the first panel 20 may further include a coating having a desired physical property and formed on the second surface of the first glass pane 21. Alternatively, the first panel 20 does not have to be provided with the coating 22. That is, the first panel 20 may include only the first glass pane 21.

Moreover, the second panel 30 may further include a coating having a desired physical property. The coating includes at least one of thin films formed on the first surface and the second surface of, for example, the second glass pane 31. Examples of the coating include an infrared reflective film and an ultraviolet reflecting film which reflect light having a prescribed wavelength.

In the embodiments, the internal space 500 is partitioned into one first space 510 and one second space 520. However, the internal space 500 may be partitioned into one or more first spaces 510 and one or more second spaces 520.

In the embodiments, the second thermal adhesive is the same as the first thermal adhesive, and the second softening point is equal to the first softening point. However, the second thermal adhesive may be a material different from the first thermal adhesive. For example, the second thermal adhesive may have a second softening point different from the first softening point of the first thermal adhesive.

Moreover, the first adhesive and the second thermal adhesive are not limited to the glass frit but may be, for example, low-melting-point metal or a hot-melt adhesive material.

As can be seen from the first to fourth embodiments described above, a method for manufacturing a glass panel unit 10 of a first aspect according to the present disclosure includes an adhesive disposing step, a glass composite generation step, an internal space forming step, an evacuation step, and an evacuated space forming step. The adhesive disposing step is a step of disposing a thermal adhesive on a first panel 20 or a second panel 30. The glass composite generation step is a step of disposing the second panel 30 to face the first panel 20 to generate a glass composite including the first panel 20, the second panel 30, and the thermal adhesive. The glass composite has an evacuation port 700 and an evacuation path 600. The evacuation port 700 is formed in at least any one of the first panel 20, the second panel 30, or a first portion 410 of the thermal adhesive which is to serve as a seal 40 later. The evacuation path 600 is located between the first portion 410 and a second portion 420 of the thermal adhesive and extends to the evacuation port 700. The internal space forming step is a step of heating the glass composite to melt the thermal adhesive so as to form an internal space 500 surrounded by the first panel 20, the second panel 30, and a melted substance of the thermal adhesive except for the evacuation port 700. The evacuation step is a step of exhausting gas from the internal space 500 to evacuate the internal space 500. The evacuated space forming step is a step of, while the internal space is kept in an evacuated state, heating and applying force to part of at least the first portion 410 or the second portion 420 to deform the part to close the evacuation path 600 such that the internal space 500 is sealed to form an evacuated space 50 hermetically closed.

With the method for manufacturing the glass panel unit 10 of the first aspect, gas released from the thermal adhesive (the first portion 410 and the second portion 420) is less than unnecessary gas released from the entirety of the first portion 410 and the second portion 420 when the entirety of the first portion 410 and the second portion 420 are heated in the evacuated space forming step.

A method for manufacturing a glass panel unit 10 of a second aspect according to the present disclosure is realized in combination with the first aspect. In the method for manufacturing the glass panel unit 10 of the second aspect, the evacuated space forming step includes applying force resulting from atmospheric pressure to part of the first portion 410 or the second portion 420 to deform the part of the first portion 410 or the second portion 420 to close the evacuation path 600.

The method for manufacturing the glass panel unit 10 of the second aspect requires no jig 830 and enables a simple configuration to perform the evacuated space forming step.

A method for manufacturing a glass panel unit 10 of a third aspect according to the present disclosure is realized in combination with the first or second aspect. In the method for manufacturing the glass panel 10 of the third aspect, the glass composite has one or more ventilation paths 610 between the first portion 410 and a third portion 430 of the thermal adhesive. The evacuated space forming step includes heating and applying force to part of at least the first portion 410 or the third portion 430 to deform the part of at least the first portion 410 or the third portion 430 to close the ventilation path 610 such that the internal space 500 is divided into a plurality of evacuated spaces 50.

With the method for manufacturing the glass panel unit 10 of the third aspect, a plurality of glass panel units 10 each having the evacuated space 50 is obtainable from one glass panel unit 10.

A method for manufacturing a glass panel unit 10 of a fourth aspect according to the present disclosure is realized in combination with any one of the first to third aspects. The method for manufacturing the glass panel unit 10 of the fourth aspect further includes a second internal space forming step. The second internal space forming step includes disposing: a third panel 90; and a third thermal adhesive between a third panel 90 and either the first panel 20 or the second panel 30. Thus, in the second internal space forming step, a second internal space 540 surrounded by the third panel 90, the first panel 20 or the second panel 30, and the third thermal adhesive is formed.

The method for manufacturing the glass panel unit 10 of the fourth aspect enables a glass panel unit 10 having further improved thermal insulation properties to be manufactured.

A method for manufacturing a glass window 95 of a fifth aspect according to the present disclosure includes a step of fitting the glass panel unit 10 manufactured by the method of any one of the first to fourth aspects into a window frame 96 to manufacture a glass window 95.

The manufacturing method of the glass window 95 of the fifth aspect enables a glass window 95 having further improved thermal insulation properties to be manufactured.

REFERENCE SIGNS LIST

10 GLASS PANEL UNIT
20 FIRST PANEL
21 FIRST GLASS PANE
30 SECOND PANEL
31 SECOND GLASS PANE
40 SEAL
410 FIRST PORTION
420 SECOND PORTION
430 THIRD PORTION
50 EVACUATED SPACE
500 INTERNAL SPACE

540 SECOND INTERNAL SPACE
600 EVACUATION PATH
610 VENTILATION PATH
700 EVACUATION PORT
90 THIRD PANEL
91 THIRD GLASS PANE
95 GLASS WINDOW
96 WINDOW FRAME

The invention claimed is:

1. A method for manufacturing a glass panel unit, the method comprising:
    an adhesive disposing step of disposing a thermal adhesive on a first panel or a second panel;
    a glass composite generation step of disposing the second panel to face the first panel to generate a glass composite which includes the first panel, the second panel, and the thermal adhesive and which has an evacuation port and an evacuation path,
    the evacuation port being formed in at least any one of the first panel, the second panel, or a first portion of the thermal adhesive which is to serve as a seal later, and
    the evacuation path being located between the first portion and a second portion of the thermal adhesive and extending to the evacuation port;
    an internal space forming step of heating the glass composite to melt the thermal adhesive to form an internal space surrounded by the first panel, the second panel, and a melted substance of the thermal adhesive except for the evacuation port;
    an evacuation step of exhausting gas from the internal space to evacuate the internal space; and
    an evacuated space forming step of, while the internal space is kept in an evacuated state, heating and applying force by a jig which is inserted between the first panel and the second panel to part of at least the first portion or the second portion to deform the part to close the evacuation path such that the internal space is sealed to form an evacuated space hermetically closed.

2. The method of claim 1, wherein
    the glass composite has one or more ventilation paths between the first portion and a third portion of the thermal adhesive, and
    the evacuated space forming step includes heating and applying force to part of at least the first portion or the third portion to deform the part of at least the first portion or the third portion to close the ventilation path such that the internal space is divided into a plurality of evacuated spaces.

3. The method of claim 1, further comprising a second internal space forming step of forming a second internal space by disposing:
    a third panel; and
    a third panel thermal adhesive between the third panel and either the first panel or the second panel, the second internal space being surrounded by the third panel, the first panel or the second panel, and the third thermal adhesive.

4. A method for manufacturing a glass window, the method comprising step of fitting the glass panel unit manufactured by the method of claim 1 in a window frame to manufacture a glass window.

* * * * *